Oct. 28, 1947. E. E. CALHOUN 2,429,922
CHUCK FOR FRAZING MACHINES
Filed Aug. 27, 1945
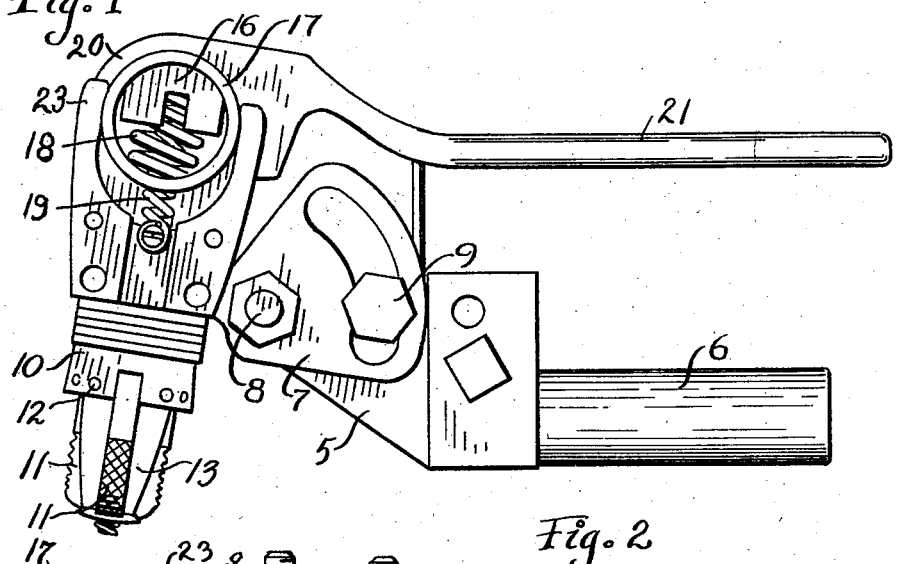
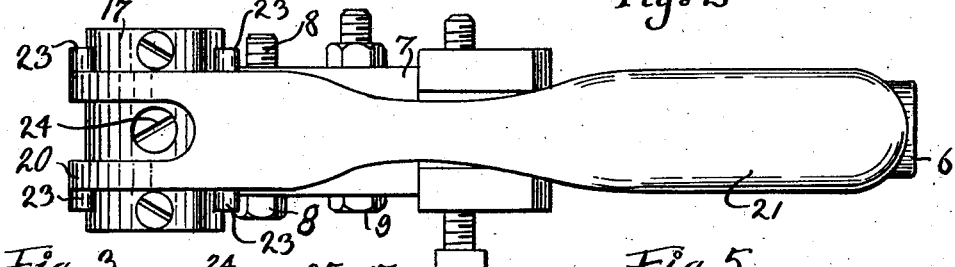
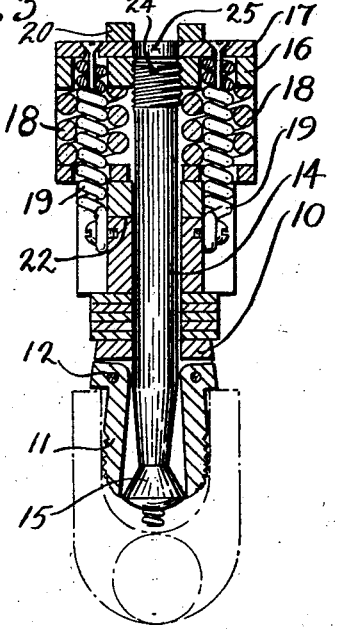
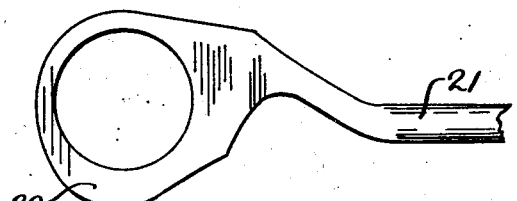
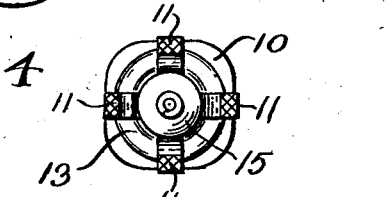
INVENTOR.
EARL E. CALHOUN
BY
ATTORNEY.

Patented Oct. 28, 1947

2,429,922

UNITED STATES PATENT OFFICE 2,429,922

CHUCK FOR FRAZING MACHINES

Earl E. Calhoun, Shulls Mills, N. C., assignor to David P. Lavietes, Boone, N. C.

Application August 27, 1945, Serial No. 612,798

9 Claims. (Cl. 279—2)

1

My invention relates to a special type of chuck for frazing machines used for holding and shaping parts of wooden pipes and constitutes an improvement on the invention of application Serial Number 493,732, filed July 7, 1943, now Patent No. 2,385,346, granted September 25, 1945.

One object is to provide a chuck having jaws adapted to fit in various sizes of bowls.

Another object is to provide a device which can not only be readily adapted to different sizes but the bowl can be readily ejected when the work is finished.

Another object is to avoid splitting the stummels.

Another object is to facilitate the use of the tool and thus reduce the labor of operation.

It should be understood that the tool may be used in any suitable commercial form of frazing machine.

Fig. 1 is a side view of a tool embodying the improved form of my invention, the jaws being expanded.

Fig. 2 is a plan view of the same.

Fig. 3 is a cross sectional view along the axis of the spreader pin or jaw actuator and showing a stummel in dotted lines in place.

Fig. 4 is an end view of the chuck jaws and the spreader pin.

Fig. 5 is a side view of a part of the cam actuator and handle.

The supporting block 5 has a stem 6 adapted to be mounted on the usual rotatable shaft of the machine (not shown). On the block 5 is mounted a frame 7 adapted to be angularly adjusted by turning it on the pin 8 and clamping the screw or bolt 9.

The chuck itself has a base 10 secured to the frame 7 and to which the jaws 11 are hinged at 12. Stationary separator fingers 13 are preferably arranged between the jaws.

An actuator pin 14 extends between the jaws and through the base and frame. The lower end of this pin has a tapered head 15 adapted to be drawn upwards between the jaws to expand them into engagement with the inside of an applied stummel and adapted to be projected downward below the jaws to eject the finished work.

The upper end of the pin shaft is screw threaded into a cross-piece 16 within a hollow cylinder or tube 17 and springs 18, 18 are interposed between the ends of this cross-piece and the opposite wall of the tube. Tension springs 19 connect the upper wall of the tube to a part of the frame so as to draw the pin downwardly to eject the stummel.

2

This tube 17 is mounted within a cam 20 which is rotatable about the tube by a handle lever 21. The cam bears against the hardened wear plate 22 when the cam is turned to draw the pin 14 and its head 15 upwards to expand the jaws of the chuck. The springs 19 and the tube 17 hold the cam to its seat. The posts 23, 23 guide the tube and cam.

The upper end of the pin 14 is slotted at 24 and exposed through a hole 25 in the tube so as to permit convenient adjustment of the pin and its head 15.

When the cam is rotated toward the position of Fig. 1, the tube 17 together with the cross-piece 16, springs 18 and the pin 14 are moved upwardly until the jaws are expanded to engage the inner wall of the bowl at which time the pin and the attached cross-piece stop their upward movement and the continued movement of the lever actuated cam then compresses the springs 18. There is therefore considerable leeway in the possible movement of the cam without unduly straining the bowl. In other words, the movement of the cam beyond that required to cause active engagement of the jaws is compensated for by the compression of the springs 18.

By rotating and adjusting the pin in the cross-piece 16, the desired expansion of the jaws may be effected. The springs provide a yielding abutment for the cam action so that when the recess or hole in a bowl is small the springs pull down and make up the difference, and when the hole is large the springs take up the difference, and there is in no case any tendency to split the bowls of the pipes.

Once properly set the parts do not need adjusting and may be operated with a minimum of effort.

I claim:

1. A chuck for a frazing machine comprising a support, a series of jaws hinged thereto, a pin passing through said support and having a tapered head on its lower end for expanding said jaws when the head is drawn up and adapted to be projected downward beyond said jaws for releasing said jaws and ejecting a stummel mounted on the jaws, a tube containing a cross-piece adjustably connected to the upper end of the pin, a spring interposed between said cross-piece and the opposite wall of the tube and an actuating cam rotatably mounted on said tube and engaging a wear plate on said support.

2. A chuck for a frazing machine comprising a support, a series of spaced jaws hinged thereto for supporting a stummel, a pin movable inwardly and outwardly of said jaws, a tapered head on one end of said pin adapted to expand said jaws when moved inwardly, a cross-piece on the other end of said pin, a tube supported on and enclosing said cross-piece, a lever actuated cam coacting with said tube and with said support for moving said pin inwardly to expand the jaws and spring means interposed in said tube between said cross-piece and the wall of the tube for absorbing the thrust of the camming action and spring means connecting said tube with said support.

3. A chuck for a frazing machine comprising a support, a series of jaws hinged thereto for supporting a stummel, a movable pin extending through said support and jaws and having a tapered head on its outer end for expanding said jaws when the head is drawn in, said head being adapted to be projected outwardly beyond said jaws for releasing said jaws and ejecting the stummel, a cross-piece adjustably connected to the upper end of the pin, a tube supported on and enclosing said cross-piece, spring means interposed between the cross-piece and the wall of the tube and an actuating cam rotatably supported on the tube and engaging a wear plate on the support for moving said head inwardly to expand the jaws.

4. A frazing tool comprising a body, a series of expandable jaws carried thereby, an expanding pin movable between said jaws and through said body, a cylindrical tube guided in said body, a cross-piece mounted in said tube and connected to said pin, a cam mounted on said tube and coacting with said body, springs connecting said body to said tube and springs interposed between the inner walls of the tube and said cross piece.

5. A frazing tool comprising a body, a series of expandable jaws carried thereby, an expanding pin movable between said jaws and through said body, a cylindrical tube guided in said body, a cross-piece mounted in said tube and connected to said pin, a cam mounted on said tube and coacting with said body, springs connecting said body to said tube and springs interposed between the inner walls of the tube and said cross piece, said cam member and said tube having passages providing access to the end of said pin and said body having means laterally guiding said cam.

6. A chuck for a frazing machine comprising a support, a series of spaced jaws hinged thereto for supporting a stummel, a pin movable inwardly and outwardly of said jaws, a tapered head on one end of said pin adapted to expand said jaws when moved inwardly, a cross-piece on the opposite end of said pin, cam actuated means coacting with said support and with said cross-piece for moving said pin inwardly to expand the jaws and a compression spring under each end of the cross-piece between said cross-piece and support for absorbing the thrust of the camming action.

7. A frazing tool comprising a body, a series of expandable jaws carried thereby, an expanding pin movable between said jaws and through said body, a cylindrical tube guided in said body, a cross-piece mounted in said tube and connected to said pin, a cam mounted on said tube and coacting with said body, two tension springs connecting said body to the upper wall of the tube, one being arranged at each end of the tube and springs interposed between the inner wall of the tube and said cross-piece.

8. A frazing tool comprising a body, a series of expandable jaws carried thereby, an expanding pin movable between said jaws and through said body, a cylindrical tube guided in said body, a cross-piece mounted in said tube and connected to said pin, a cam mounted on said tube and coacting with said body, a compression spring on each side of the expanding pin between the cross-piece and tube and a tension spring within each compression spring connecting the tube to the body.

9. A chuck for a frazing machine comprising a support, a series of elongated jaws, each of which is hinged at one end to said support and movable at the other end, a pin extending through said support and having a tapered head arranged to move between said jaws for expanding said jaws, a tubular member guided to slide and rotate in said support, a cross-piece mounted in said tubular member, said pin being adjustably connected to said cross-piece, tension spring means connecting said tubular member and said support and biasing said tubular member toward said support and longitudinally of said pin, compression spring means interposed between said cross-piece and said tubular member and camming means coacting with said support and with said tubular member for moving the tubular member and actuating said cross-piece and the attached pin to expand said jaws.

EARL E. CALHOUN.

REFERENCES CITED

The following references are of record in the file of this patent:

UNITED STATES PATENTS

| Number | Name | Date |
|---|---|---|
| 2,213,379 | Bird et al. | Sept. 3, 1940 |
| 1,821,199 | Yager | Sept. 1, 1931 |
| 1,846,898 | Packer | Feb. 23, 1932 |
| 1,320,660 | Thompson | Nov. 4, 1919 |
| 2,345,246 | Elka | Mar. 28, 1944 |